M. B. MILLER.
Air-Compressing Fan.

No. 221,970. Patented Nov. 25, 1879.

Witnesses
Geo. H. Strong.
Frank A. Brooks.

Inventor,
Morgan B. Miller,
By Dewey & Co. Atty

UNITED STATES PATENT OFFICE.

MORGAN B. MILLER, OF SAN FRANCISCO, CALIFORNIA.

IMPROVEMENT IN AIR-COMPRESSING FANS.

Specification forming part of Letters Patent No. 221,970, dated November 25, 1879; application filed April 11, 1879.

*To all whom it may concern:*

Be it known that I, MORGAN B. MILLER, of the city and county of San Francisco, and State of California, have invented an Air-Compressing Fan; and I hereby declare the following to be a full, clear, and exact description thereof, reference being had to the accompanying drawings.

My invention relates to an improved fan-blower, which I call an "air-compressing fan;" and my improvements consist in making the arms or blades of the fan in a peculiar shape, like a conical ogee curve, so that they will both draw in and force out the air with great facility, as is more fully described in the accompanying drawings, in which—

Figure 1:
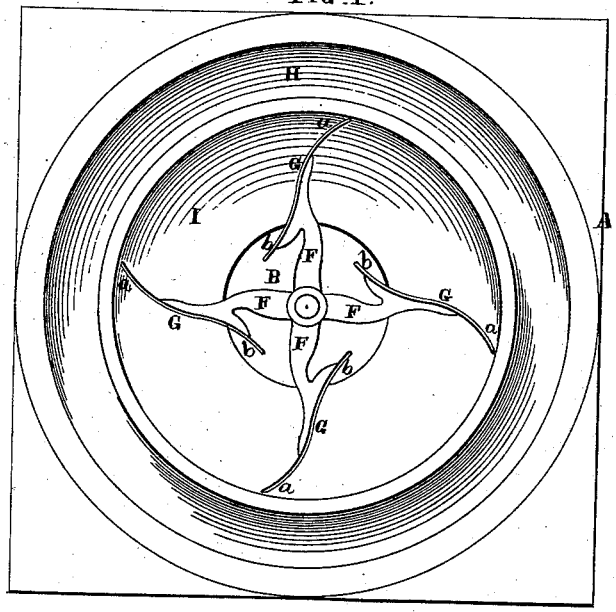
Figure 2:
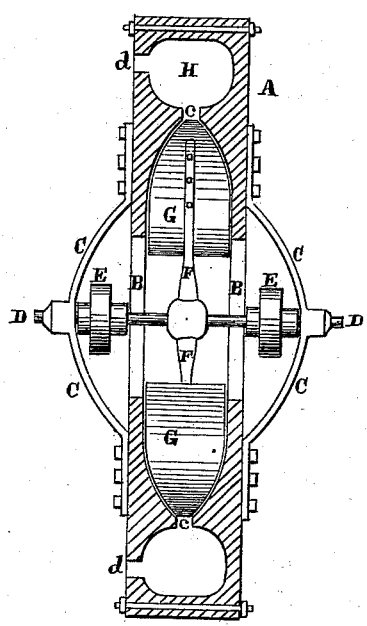
Figure 3:
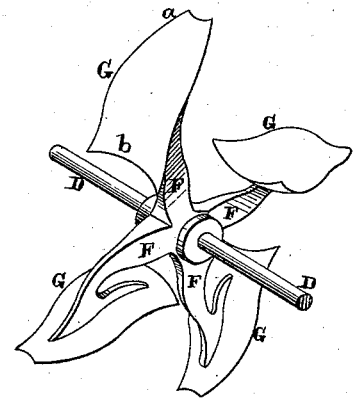

Figure 1 is a longitudinal section. Fig. 2 is a transverse section. Fig. 3 is a view of the fan.

The case A is made of any desirable shape as regards its exterior, and is provided with central openings, B, for the admission of the air, as shown. Braces or supports C are secured to the sides of the case for carrying the journals or boxes of the shaft D. On this shaft are the driving-pulleys E, one on each side of the case, so that two belts may be used. The shaft is provided with arms F, on which are bolted or otherwise secured the fans G. These fans are made in a peculiar shape, both concave and convex, and with an ogee curve, as shown. They are also made concave lengthwise their faces, and correspond in size and shape with the central chamber, I, in which they revolve. This chamber narrows up at its outer circle, as shown, and the outer ends, *a*, or compressing portions of the fans are made convex, and narrowed or pointed to fit snugly to the chamber. The heel *b* of the fan is made concave, and formed in such a shape as to take the air from the admission-opening at the center and direct it into the chamber toward the outer points of the fans, by which it is forced into the supplemental chamber or compression-box H, as hereinafter described.

A slot or passage, *c*, is formed around the central chamber, which opens into the compression-box H. This compression-box is made of any suitable size and shape, so as to encircle the central chamber, and has one or more emission-openings, *d*, to which pipes are attached for leading the blast to any desired point, and for any purpose.

The object of this device is to give a great pressure of air with comparatively small power. This is accomplished by making the fans in the peculiar shape described and shown. The heels of these fans, being made concave and projecting out by the edge of the case into the central opening, direct or throw the air into the center of the chamber. The faces of the fans are made convex, and the air is thus directed up the fans toward the periphery of the wheel.

The outer ends of the fan are made convex, while the fans remain concave, and the air is thus blown with great force through the opening *c* into the compression-box or supplemental chamber.

The fan is rotated very rapidly, and air is forced into this box so strongly that it is more or less compressed, so that the pipes leading the air from the box convey the air in a compressed state to the point of issue. A very strong blast is obtained in this way without any undue expenditure of power, and this class of blowers thereby very much increased in efficiency.

By curving the outer ends or points of the fans and making the curve convex, as the fan rotates it not only compresses the air into the reservoir or box, but prevents it returning again through the slot into the central chamber. The arms F have their outer ends curved and set at an angle from the vertical axis, as shown, and on these ends are secured the fans. The air caught up by the heels of the fans is thereby directed inwardly, and cannot get back out of the central opening.

Having thus described my invention, what I claim as new, and desire to secure by Letters Patent, is—

1. The air-compressing fan composed of the curved arms F, with their curved fans or wings G, having a concave face, with concave heels *b*, projecting beyond the edge of the inlet, and convex points *a*, whereby the air is more effectually drawn in and forced out of the chamber in which the fan rotates, substantially as and for the purpose herein described.

2. An air-compressing fan composed of the curved arms F, mounted on a central shaft, and carrying the fans or wings G, having concave faces, convex points $a$, and concave heels $b$, rotating in a central chamber or case having a central admission-opening, in combination with the air-compression box H, having the inlet and outlet passages $c\ d$, whereby the air is compressed in said box H, substantially as and for the purpose set forth.

In witness whereof I have hereunto set my hand.

MORGAN B. MILLER.

Witnesses:
   CHAS. G. YALE,
   S. H. NOURSE.